(12) United States Patent
Kowtun et al.

(10) Patent No.: US 12,257,962 B2
(45) Date of Patent: Mar. 25, 2025

(54) ELECTRICAL ASSEMBLY

(71) Applicant: Lear Corporation, Southfield, MI (US)

(72) Inventors: Peter Kowtun, Plymouth, MI (US); Christopher J. Darr, Livonia, MI (US)

(73) Assignee: Lear Corporation, Southfield, MI (US)

( * ) Notice: Subject to any disclaimer, the term of this patent is extended or adjusted under 35 U.S.C. 154(b) by 370 days.

(21) Appl. No.: 17/830,887

(22) Filed: Jun. 2, 2022

(65) Prior Publication Data
US 2023/0391279 A1    Dec. 7, 2023

(51) Int. Cl.
| | | |
|---|---|---|
| *B60R 16/023* | (2006.01) | |
| *H01R 13/502* | (2006.01) | |
| *H01R 13/621* | (2006.01) | |
| *H02G 3/08* | (2006.01) | |
| *H02G 3/16* | (2006.01) | |

(52) U.S. Cl.
CPC ....... *B60R 16/0238* (2013.01); *H01R 13/502* (2013.01); *H01R 13/6215* (2013.01); *H02G 3/088* (2013.01); *H02G 3/16* (2013.01)

(58) Field of Classification Search
None
See application file for complete search history.

(56) References Cited

U.S. PATENT DOCUMENTS

| | | | |
|---|---|---|---|
| 5,550,712 A | 8/1996 | Crockett | |
| 5,608,611 A * | 3/1997 | Szudarek | H05K 9/0039 361/753 |
| 6,511,340 B1 | 1/2003 | Lopez | |
| 7,227,761 B2 | 6/2007 | Estes et al. | |
| 9,422,003 B2 | 8/2016 | Yun et al. | |
| 10,283,917 B1 | 5/2019 | Darr et al. | |
| 2009/0237893 A1 | 9/2009 | Yang | |
| 2009/0255703 A1* | 10/2009 | Vigorito | H02G 3/081 174/67 |
| 2012/0238147 A1* | 9/2012 | Matsumoto | H01R 13/512 439/660 |
| 2019/0123522 A1 | 4/2019 | Darr et al. | |
| 2021/0257820 A1* | 8/2021 | Voelzke | H02G 3/14 |

* cited by examiner

*Primary Examiner* — Oscar C Jimenez
(74) *Attorney, Agent, or Firm* — Fishman Stewart PLLC

(57) ABSTRACT

An electrical assembly may include a housing and an inner housing. The housing may include a base and a cover. The cover may be releasably connectable to the base. The inner housing may be disposed at least partially in the housing. The inner housing may include a connection tower, which may be configured to receive at least a portion of a fastener. The cover may include a cover opening via which said fastener may be insertable into the connection tower. The base may include a base opening into which a portion of said fastener may be insertable. The connection tower may be configured to provide a seal for the cover opening.

20 Claims, 9 Drawing Sheets

ELECTRICAL ASSEMBLY

TECHNICAL FIELD

The present disclosure generally relates to electrical assemblies, including electrical assemblies that may include electrical units, electrical unit housings, and/or electrical connectors that may, for example, be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex to use and/or to assemble. For example, with some designs, a housing cover needs to be removed to access fasteners when mounting the electrical assembly, which may result in one or more components of the electrical assembly (e.g., the housing cover) being mishandled, damaged, and/or incorrectly reinstalled.

There is a desire for solutions/options that minimize or eliminate one or more challenges or shortcomings of electrical assemblies. The foregoing discussion is intended only to illustrate examples of the present field and is not a disavowal of scope.

SUMMARY

In embodiments, an electrical assembly may include a housing and an inner housing. The housing may include a base and a cover. The cover may be releasably connectable to the base. The inner housing may be disposed at least partially in the housing. The inner housing may include a connection tower, which may be configured to receive at least a portion of a fastener. The cover may include a cover opening via which said fastener may be insertable into the connection tower. The base may include a base opening into which a portion of said fastener may be insertable. The connection tower may be configured to provide a seal for the cover opening.

In embodiments, a method of assembling an electrical assembly may include disposing the inner housing and the base such that the second end of the connection tower contacts the base. The method may include disposing the cover and the inner housing such that the first end of the connection tower contacts the cover. The method may include connecting the cover and the base together to form the housing.

In embodiments, a method of mounting an electrical assembly may include connecting the electrical assembly with at least one of an electrical connector and a support structure of a vehicle, which may include engaging the fastener with the at least one of the electrical connector and the support structure without disconnecting the cover from the base.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
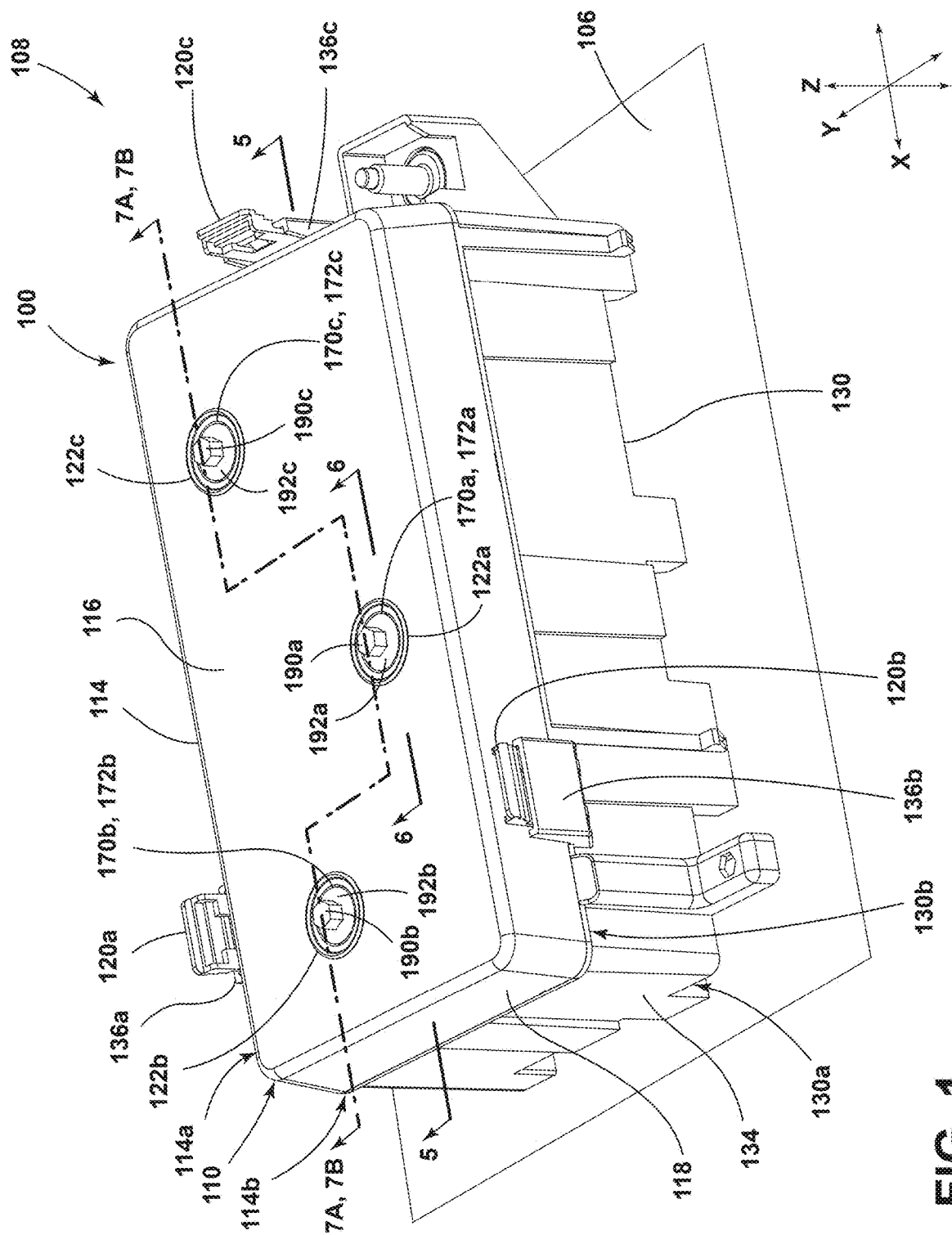
FIG. 1 is a perspective view generally illustrating an embodiment of an electrical assembly according to teachings of the present disclosure.
Figure 7A:
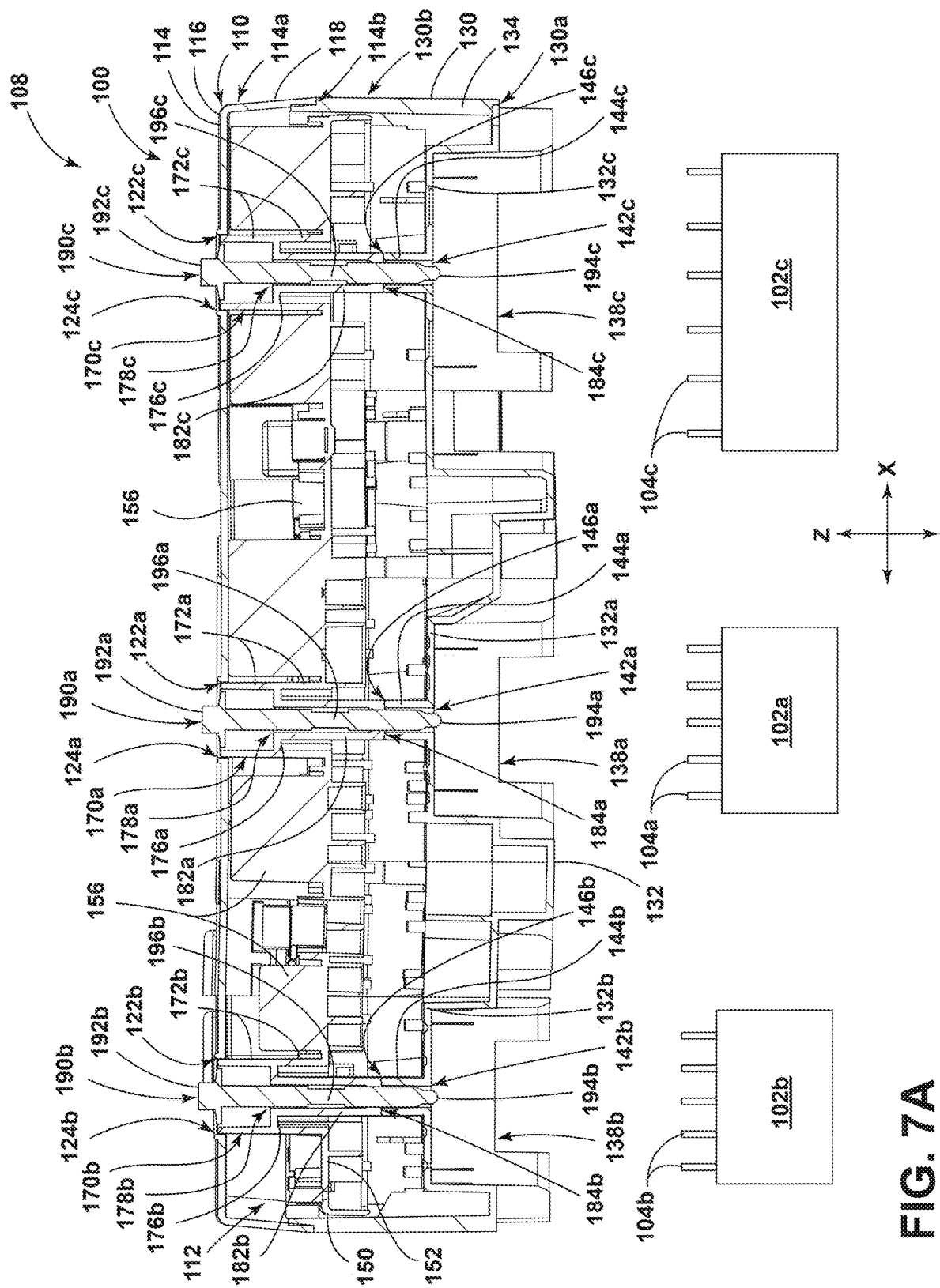
FIG. 7A is a cross-sectional view generally illustrating an embodiment of an electrical assembly with the fasteners disposed in a first position according to teachings of the present disclosure.

With some embodiments, such as generally illustrated in FIG. 1, an electrical assembly 100 is configured to receive and/or distribute electrical power to one or more other components (e.g., vehicle components/systems). The electrical assembly 100 may be configured as a fuse box, a power distribution unit (PDU), and/or a power distribution box (PDB). An electrical assembly 100 includes a housing 110, an inner housing 150, and/or one or more fasteners 190a-190c (see, e.g., FIG. 4). A housing 110 is connectable to and/or mountable on one or more electrical connectors 102a-102c (see, e.g., FIGS. 7A and 7B) and/or support structures 106 (see, e.g., FIG. 1), such as of a vehicle 108. A fastener 190a-190c is releasably connectable to an electrical connector 102a-102c, a support structure 106, a housing 110, and/or an inner housing 150, such as to connect, secure, lock, and/or fix an electrical assembly 100 to on one or more electrical connectors 102a-102c (see, e.g., FIG. 7B) and/or support structures 106 (see, e.g., FIG. 1).

With some embodiments, such as generally illustrated in FIGS. 1 and 4-7B, a housing 110 receives and/or retains one or more electrical components 126, such as circuit boards, relays, fuses, switches, controllers, capacitors, resistors, inductors, and/or diodes, among others (see, e.g., FIGS. 3A, 4, 5, 7A, 7B). The housing 110 may have a generally rectangular shape. The housing 110 has a base 130 and a cover 114. The cover 114 is releasably connectable to a base 130, such as to close the base 130 and/or form the housing 110. A housing 110 (e.g., a base 130 and a cover 114) has and/or at least partially defines an internal space 112. An inner housing 150 and/or one or more electrical components 126 are disposed at least partially in the internal space 112. A base 130, an inner housing 150, and a cover 114 may, in some configurations, be disposed in a stacked and/or overlapping configuration. For example, the base 130 is disposed on and/or connected to a support structure 106 (see, FIG. 1) and/or an electrical connector 102a-102c (see, FIG. 7B). The inner housing 150 is disposed at least partially above/on top of portions of the base 130 and/or one or more electrical components 126. One or more electrical components 126 may be disposed on (e.g., on top of) and/or connected to portions of an inner housing 150. The cover 114 is disposed at least partially above/on top of a base 130 and/or an inner housing 150. The cover 114, the base 130, and/or the inner housing 150 may comprise one or more materials, such as a plastic material, a low durometer plastic material, and/or a rubber material. For example and without limitation, the inner housing 150 and/or one or more connection towers 170a-170c may comprise a low durometer plastic configured for providing a fluid seal relative to the cover 114.

With some embodiments, such as generally illustrated in FIGS. 1 and 4-7B, a cover 114 may include a generally rectangular or rectangular prism configuration, among other possible configurations. The cover 114 has a closed end 114a and an open end 114b, which is disposed opposite the closed end 114a (e.g., relative to a Z-direction). The cover 114 has a main portion 116 and/or one or more wall portions 118. The main portion 116 may be generally planar and/or has a generally rectangular shape. The main portion 116 defines a closed end 114a of the cover 114 and may extend substantially perpendicular or obliquely to a Z-direction. One or more wall portions 118 project away from the main portion 116 generally in a Z-direction (e.g., perpendicularly or obliquely relative to the main portion 116), and/or may be configured to engage, contact, and/or abut a base 130. The main portion 116 and/or one or more wall portions 118 may surround and/or at least partially define an internal space 112 of the housing 110. The cover 114 includes one or more latches 120a-120c, which may be configured to engage a corresponding tab 136a-136c of the base 130 to, for example, releasably connect the cover 114 and the base 130 together to form a housing 110. One or more latches 120a-120c extend and/or protrude from the cover 114 (e.g., from one or more wall portions 118 of the cover 114), such as generally away from a base 130 and/or generally in a Z-direction. One or more latches 120a-120c may be configured to adjust, deflect, flex, etc., such as to disengage a tab 136a-136c and disconnect the cover 114 and the base 130. The cover 114 may be configured as an external cover such that one or more cover openings 122a-122c (e.g., all cover openings 122a-122c) are not covered, at least in one direction (e.g., a Z-direction) by another portion of the housing 110 and/or such that one or more fasteners 190a-190c (e.g., all fasteners 190a-190c) are accessible without removing a portion of the housing 110.

With some embodiments, such as generally illustrated in FIGS. 1 and 5-7B, a cover 114 has one or more cover openings, such as a first cover opening 122a, a second cover opening 122b, and/or a third cover opening 122c, which may be disposed in a main portion 116. A cover opening 122a-122c may be configured as a through-hole and/or may extend completely through a main portion 116 of the cover 114 (e.g., generally in a Z-direction). One or more cover openings 122a-122c may be disposed offset from one or more other cover openings 122a-122c relative to an X-direction and/or a Y-direction (see, e.g., FIG. 1). Alternatively, one or more cover openings 122a-122c may be disposed in alignment with one or more other cover openings 122a-122c relative to an X-direction and/or a Y-direction. A cover opening 122a-122c is defined by a radially inward facing edge or surface 124a-124c of the cover 114 and/or the main portion 116. For example, a first cover opening 122a, a second cover opening 122b, and/or a third cover opening 122c are defined by a first radially inward facing surface 124a, a second radially inward facing surface 124b, and a third radially inward facing surface 124c, respectively. A cover opening 122a-122c is configured to receive at least a portion of a connection tower 170a-170c (e.g., of an inner housing 150), which may provide a seal for the cover opening 122a-122c. An inner diameter of a cover opening 122a-122c may be substantially equal to an outer diameter of a connection tower 170a-170c (e.g., a first portion 172a-172c) such that, for example, the radially inward facing surface 124a-124c of the cover opening 122a-122c abuts and/or directly contacts an outer/exterior surface 174a-174c of a connection tower 170a-170c (e.g., a first portion 172a-172c). An inner diameter of a cover opening 122a-122c may be larger than an inner diameter of a base opening 142a-142c, which may facilitate/allow insertion of a fastener 190a-190c into a connection tower 170a-170c via the cover opening 122a-122c and/or prevent the fastener 190a-190c from passing completely through the base 130 and/or the housing 110.

In some examples, an electrical assembly 100 and/or a housing 110 may include one or more seals 128 (e.g., a grommet, an O-ring, a C-ring seal, among others) configured to facilitate sealing of the housing 110 and/or one or more openings thereof (e.g., one or more cover openings 122a-122c, one or more base openings 142a-142c, one or more lip openings 178a-178c, etc.). For example, the cover 114 may include one or more cover opening seals 128 (e.g., a grommet), which may be configured to facilitate sealing of one or more cover openings 122a-122c (see, e.g., FIG. 5). A cover opening seal 128 may, for example, extend around a cover opening 122a-122c and/or may be disposed at least partially in a cover opening 122a-122c. In examples, such as those including one or more cover opening seals 128, a cover opening 122a-122c may have an inner diameter that is larger than an outer diameter of a connection tower 170a-170c such that, for example, a cover opening seal 128 may be disposed between and/or contact the radially inward facing surface 124a-124c of the cover opening 122a-122c and an outer/exterior surface 174a-174c of a connection tower 170a-170c (e.g., a first portion 172a-172c). Additionally or alternatively, one or more other seals may be disposed in a variety of other positions to facilitate sealing of the housing 110 (e.g., engaging an internal lip 176a-176c, engaging a boss 144a-144c, engaging a connection tower 170a-170c, engaging a fastener 190a-190c, among others).

With some embodiments, such as generally illustrated in FIGS. 1, 2, and 4-7B, a base 130 is configured for mounting an electrical assembly 100 and/or a housing 110 on one or more electrical connectors 102a-102c and/or support structures 106 (e.g., of a vehicle 108). The base 130 may include a generally rectangular configuration among other possible configurations. The base 130 has a closed end 130a and an open end 130b disposed opposite the closed end 130a (e.g., relative to a Z-direction). The base 130 includes a bottom portion 132 and/or one or more wall portions 134. A bottom portion 132 defines a closed end 130a of the base 130 and/or may extend substantially perpendicular or obliquely to a Z-direction. One or more wall portions 134 project away from the bottom portion 132 generally in a Z-direction (e.g., perpendicularly or obliquely relative to the bottom portion 132), and/or are configured to engage, contact, and/or abut a cover 114. The bottom portion 132 and/or one or more wall portions 134 surround and/or at least partially define an internal space 112 of the housing 110. The base 130 includes one or more tabs 136a-136c, which may be configured to engage a corresponding latch 120a-120c of the cover 114 to, for example, releasably connect the base 130 and the cover 114 together to form a housing 110. One or more tabs 136a-136c extend and/or protrude from a base 130 (e.g., one or more wall portions 134), such as generally obliquely or perpendicularly to a Z-direction.

With some embodiments, such as generally illustrated in FIGS. 5-7B, a base 130 includes include one or more connector receptacles 138a-138c configured to receive at least a portion of an electrical connector 102a-102c. A connector receptacle 138a-138c may be disposed in and/or defined by a bottom portion 132 of the base 130. A connector receptacle 138a-138c opens to an exterior of the base 130 and/or the housing 110 such that at least part of an electrical connector 102a-102c is disposable in and/or insertable into a connector receptacle 138a-138c when the housing 110 is closed (e.g., the housing 110 can be connected to electronic connectors 102a-102c when the cover 114 and the base 130 are already connected to one another).

Figure 2:
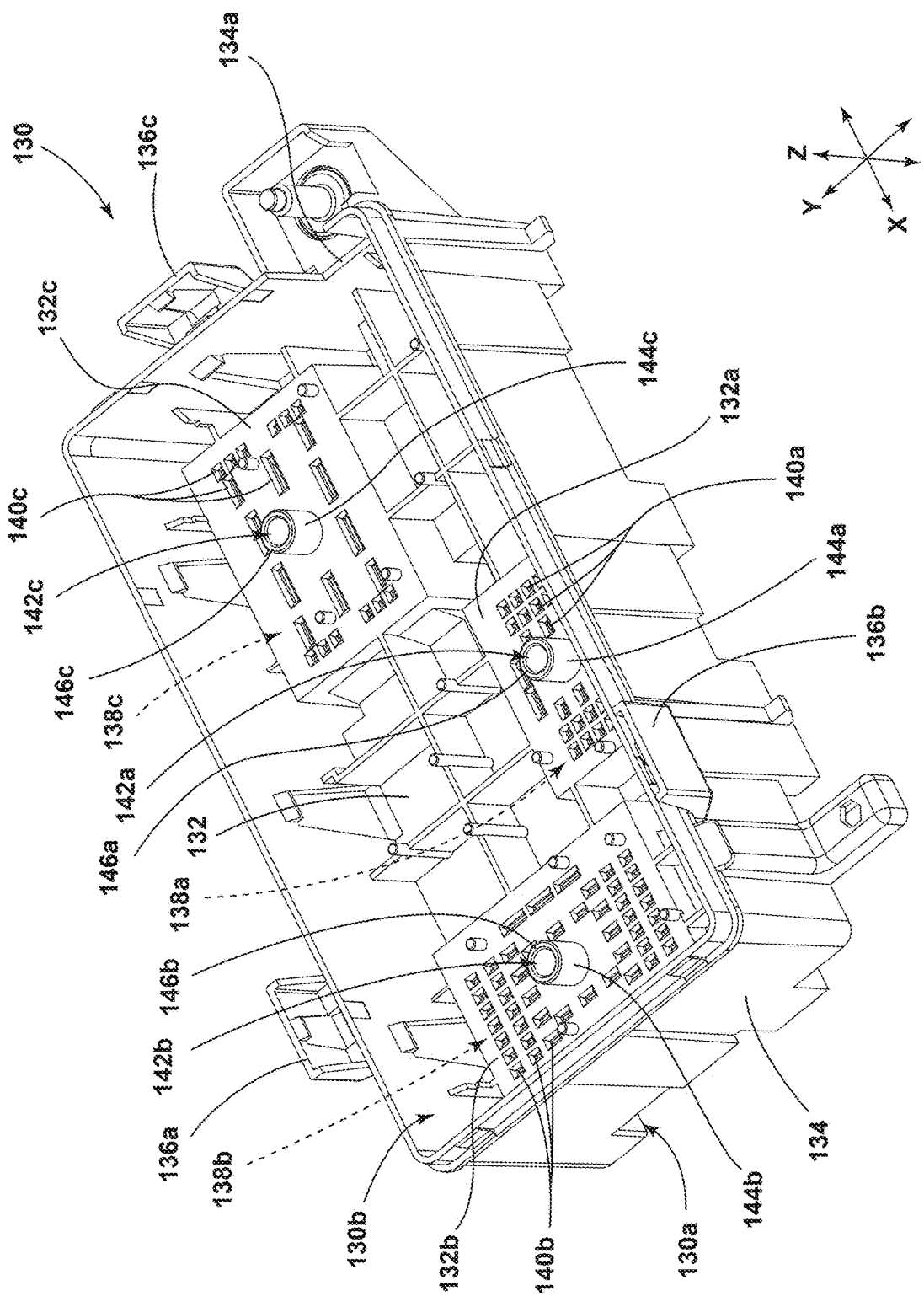
FIG. 2 is a perspective view generally illustrating an embodiment of a base according to teachings of the present disclosure.
Figure 3A:
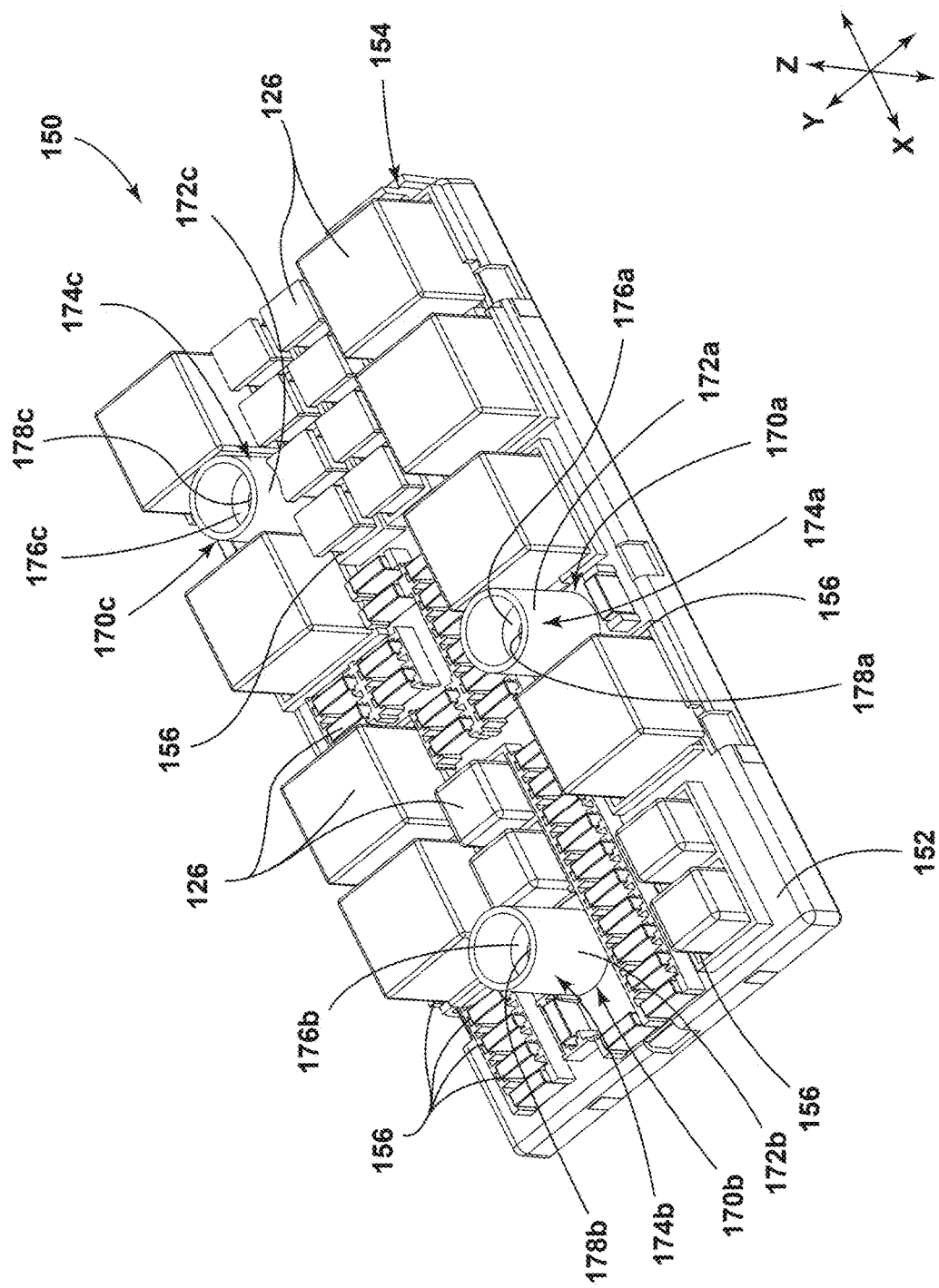
FIGS. 3A and 3B are perspective views generally illustrating an embodiment of an inner housing according to teachings of the present disclosure.
Figure 3B:
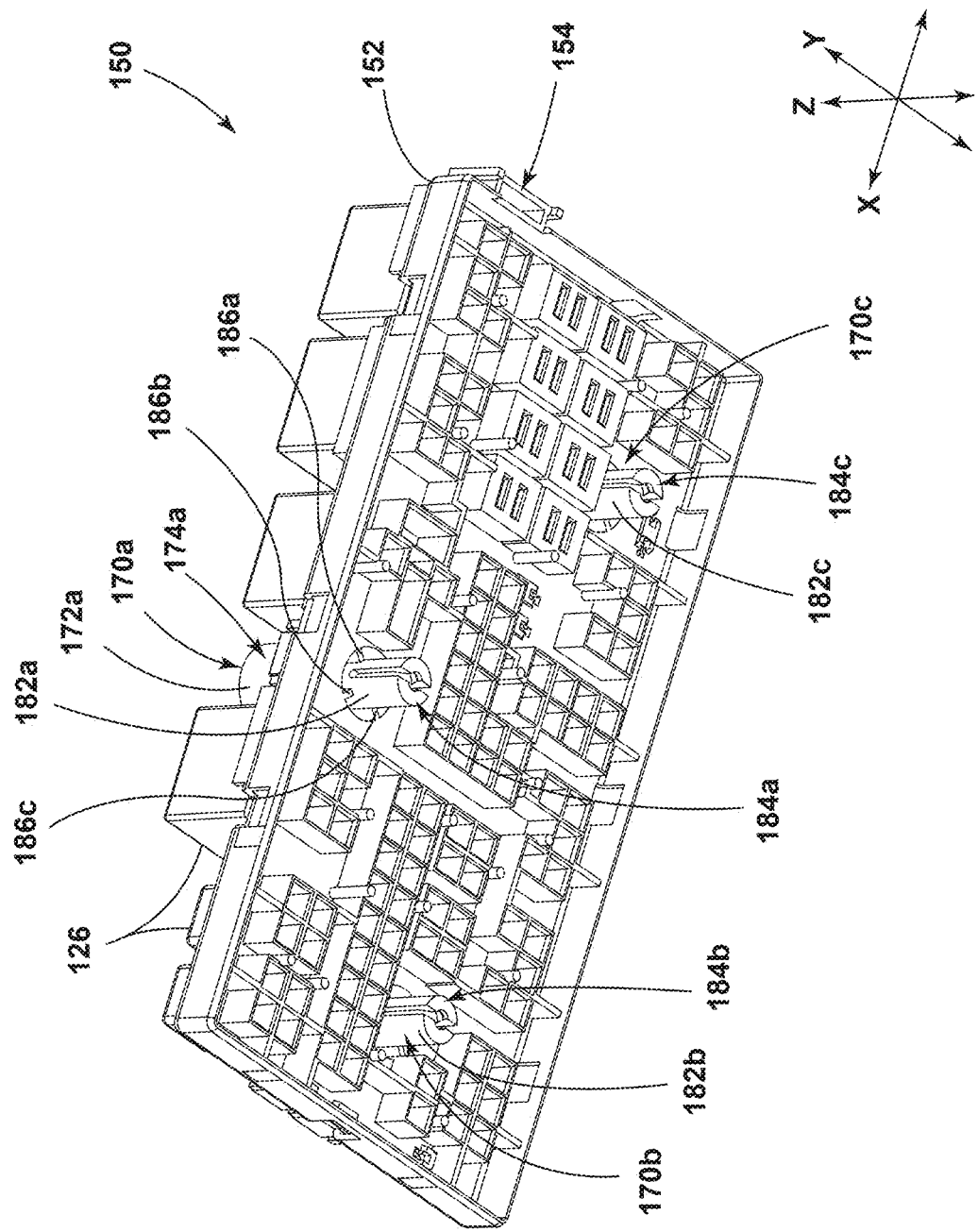
Figure 4:
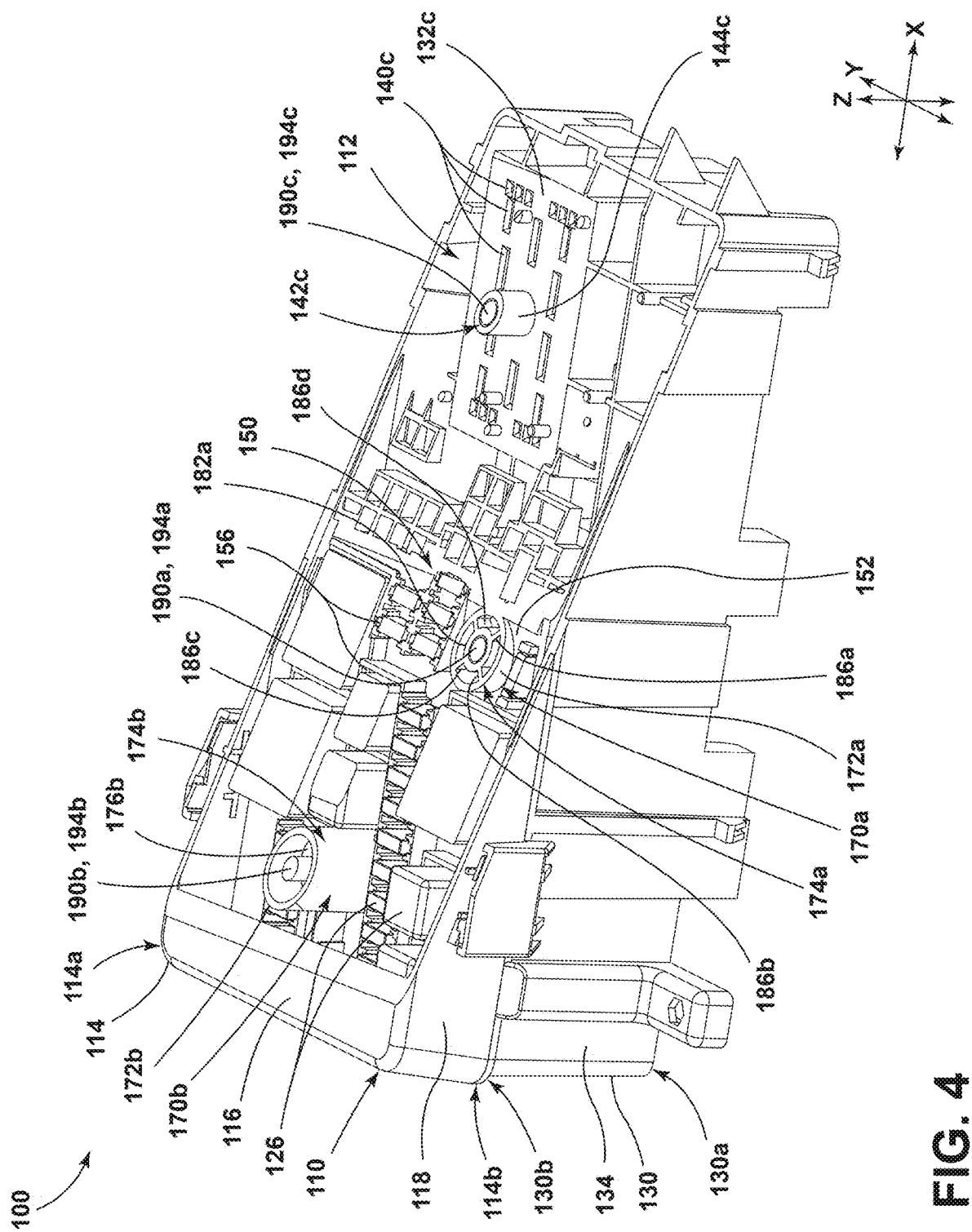
FIG. 4 is a cross-sectional perspective view generally illustrating an embodiment of an electrical assembly according to teachings of the present disclosure.
Figure 6:
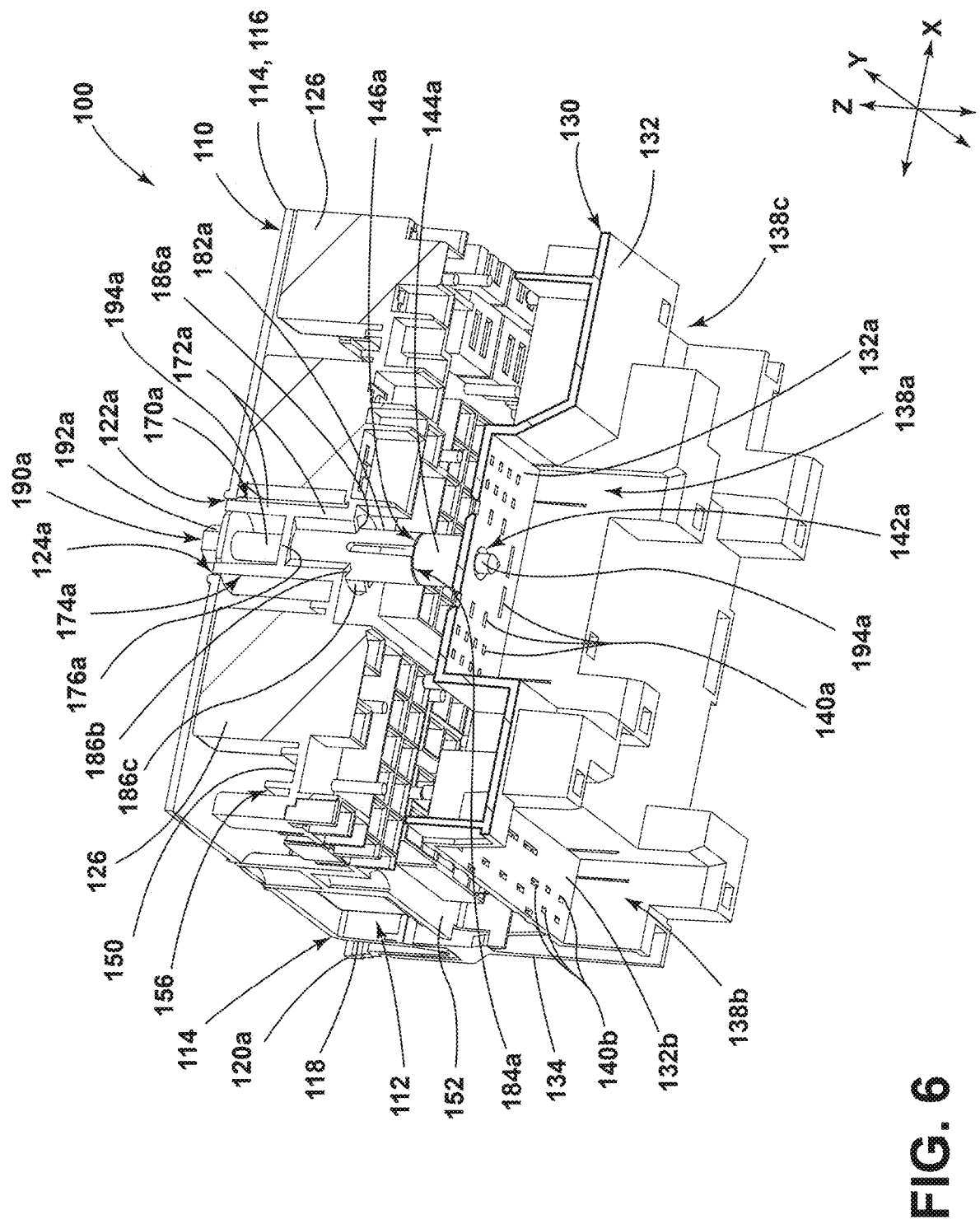
FIG. 6 is a cross-sectional perspective view generally illustrating a portion of an embodiment of an electrical assembly according to teachings of the present disclosure.

With some embodiments, such as generally illustrated in FIGS. 2, 4, and 6, a base 130 includes one or more conductor openings 140a-140c configured to receive at least a portion of an electrical conductor 104a-104c, such as terminals of an electrical connector 102a-102c and/or one or more electrical components 126. A conductor opening 140a-140c is disposed in and/or defined by a bottom portion 132 of the base 130 (e.g., a section 132a-132c of the bottom portion 132 that at least partially defines a closed end of a connector receptacle 138a-138c). A conductor opening 140a-140c may be configured as a through-hole and/or may extend completely through a bottom portion 132 of the base 130 (e.g., generally in a Z-direction). The base 130 may, for example and without limitation, include at least twenty openings 140a-140c for each electrical connector 102a-102c, in some configurations.

With some embodiments, such as generally illustrated in FIGS. 2 and 4-7B, a base 130 includes one or more base openings 142a-142c and/or one or more bosses 144a-144c configured to receive at least a portion of fastener 190a-190c. A base opening 142a-142c is at least partially disposed in and/or defined by a boss 144a-144c and/or a base 130 (e.g., a section 132a-132c of the bottom portion 132 that at least partially defines a closed end of a connector receptacle 138a-138c). At least one conductor opening 140a-140c is configured as a through-hole and/or may extend completely through a bottom portion 132 of the base 130 (e.g., generally in a Z-direction) and/or a boss 144a-144c. A boss 144a-144c may be integrally formed with and/or connected to a bottom portion 132 of the base 130. A boss 144a-144c protrudes from the bottom portion 132 of the base 130 (e.g., generally in a Z-direction) and/or extends (e.g., completely and/or partially) around a corresponding base opening 142a-142c. A boss 144a-144c is configured to contact at least a portion of a fastener 190a-190c (e.g., a shaft portion 194a-194c) to, for example, connect the fastener 190a-190c to the base 130, the housing 110, and/or the electrical assembly 100.

In some configurations, a boss 144a-144c may come into contact with the fastener 190a-190c, but may not positively engage the fastener 190a-190c (e.g., the boss 144a-144c may not materially restrict rotation of the fastener 190a-190c). In other configurations, a boss 144a-144c may be engaged with a fastener 190a-190c when the fastener 190a-190c is disposed in a first position (see, e.g., FIG. 7A), which may allow the electrical assembly 100 to be connected to and/or disconnected from an electrical connector 102a-102c and/or a support structure 106 while the fastener 190a-190c remains connected to the electrical assembly 100. Additionally or alternatively, a boss 144a-144c may be engaged with a fastener 190a-190c when the fastener 190a-190c is disposed in a second position (see, e.g., FIG. 7B), which may enhance and/or strengthen a connection between the electrical assembly 100 and an electrical connector 102a-102c and/or support structure 106 (e.g., a shaft portion 194a-194c of a fastener 190a-190c may engage the boss 144a-144c and an electrical connector 102a-102c, while a head portion 192a-192c of the fastener 190a-190c simultaneously holds and/or presses the electrical assembly 100 against the electrical connector 102a-102c).

Figure 5:
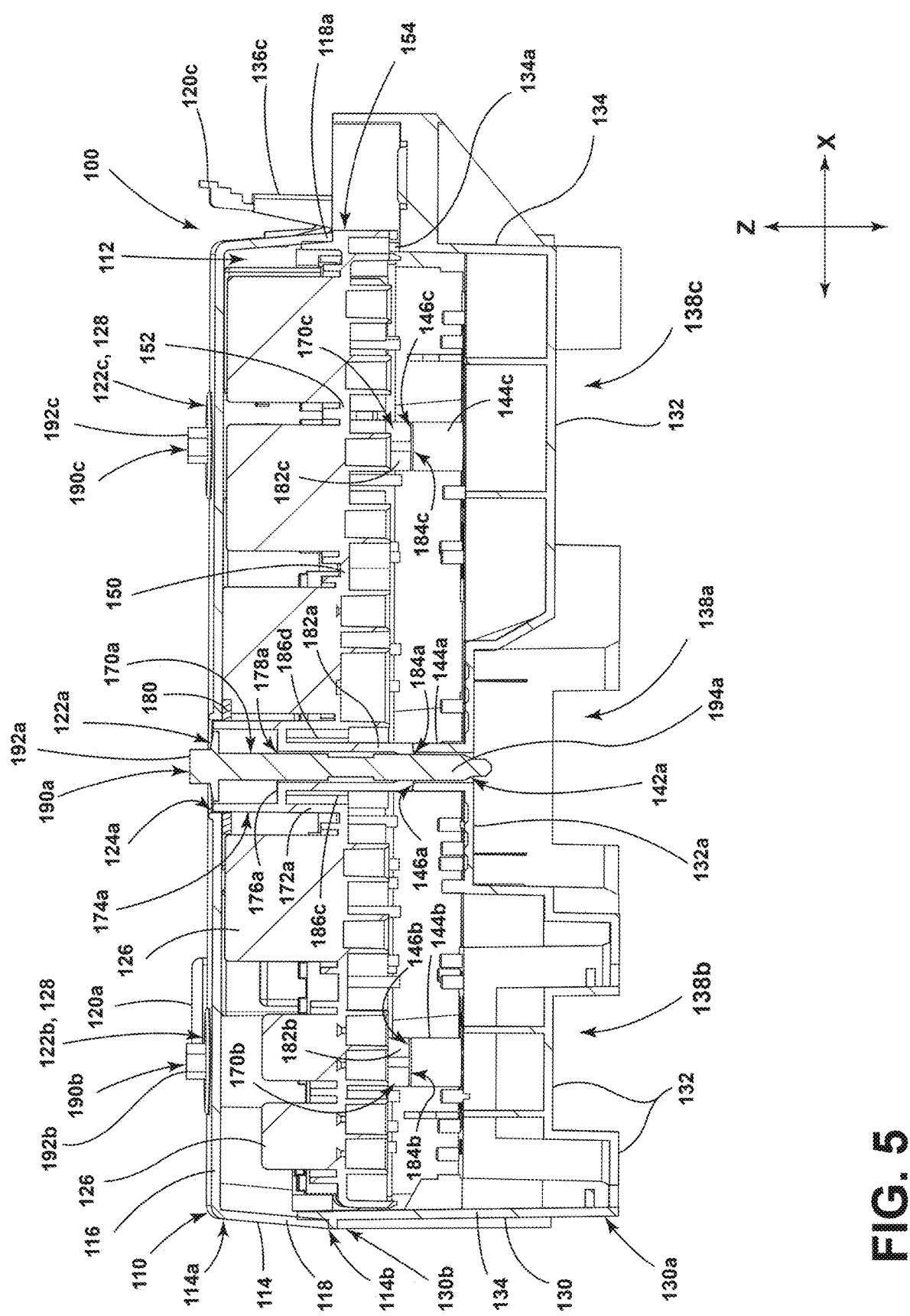
FIG. 5 is a cross-sectional view generally illustrating an embodiment of an electrical assembly according to teachings of the present disclosure.

With some embodiments, an inner housing 150 is disposed partially or entirely within an internal space 112 of a housing 110 (see, e.g., FIG. 5). As generally illustrated in FIGS. 3A-7B, some embodiments of an inner housing 150 include a main portion 152, one or more connection towers 170a-170c, and/or one or more connectors 154. The main portion 152 may be generally planar, have a generally rectangular shape, and/or may extend substantially perpendicular or obliquely to a Z-direction. In some examples, the main portion 152 includes one or more features 156 (e.g., depressions, receptacles, apertures, recesses, among others) configured to receive one or more electrical components 126. The connector 154 is configured to engage a portion (e.g., a notch and/or an edge 134a) of a base 130 and/or a portion (e.g., a notch and/or an edge 118a) of a cover 114. A connector 154 connects and/or secures the inner housing 150 to the housing 110 (e.g., a base 130 and/or a cover 114). Additionally or alternatively, a connector 154 may facilitate positioning and/or orienting the inner housing 150 within a base 130 and/or a housing 110 during assembly.

With some embodiments, such as generally illustrated in FIGS. 3A-7B, a connection tower 170a-170c is integrally formed with and/or connected to an inner housing 150 (e.g., a main portion 152). In some configurations, a connection tower 170a-170c includes a first portion 172a-172c and/or a second portion 182a-182c. The first portion 172a-172c and/or the second portion 182a-182c may be generally tubular (e.g., an elongated, annular, and/or hollow body), or may have any other appropriate shape (e.g., an elongated body with a square, hexagonal, octagonal cross-section, among others).

With some embodiments, such as generally illustrated in FIGS. 3A and 4-7B, a first portion 172a-172c protrudes from a main portion 152 of the inner housing 150 (e.g., generally in a Z-direction toward the cover 114) and/or has a free end. The first portion 172a-172c of a connection tower 170a-170c is configured to seal a cover opening 122a-122c (e.g., in a fluid tight manner). For example, in some configurations, a first portion 172a-172c (e.g., a free end thereof and/or a sealing member connected thereto) engages, contacts, and/or abuts a cover 114 around/in a region of one or more cover openings 122a-122c to seal the cover openings 122a-122c. A first portion 172a-172c (e.g., a free end thereof) projects into and/or is disposed partially in a cover opening 122a-122c. An outer diameter of a first portion 172a-172c may be substantially equal to an inner diameter of a cover opening 122a-122c such that, for example, an outer/exterior surface 174a-174c of a first portion 172a-172c abuts and/or directly contacts a radially inward facing surface 124a-124c of the cover opening 122a-122c. For example, a first portion 172a-172c may be configured for an interference fit with a cover opening 122a-122c, and/or the first portion 172a-172c may be configured to deform (e.g., radially inward), at least to a degree, during insertion into a cover opening 122a. An inner diameter of a first portion 172a-172c may be equal to and/or larger than a diameter of at least a portion of a fastener 190a-190c (e.g., a head diameter of a head portion 192a-192c of a fastener 190a-190c).

With some embodiments, such as generally illustrated in FIGS. 3A and 4-7B, a first portion 172a-172c of a connection tower 170a-170c includes an internal lip 176a-176c. An internal lip 176a-176c may be configured to contact at least a portion of a fastener 190a-190c (e.g., a head portion 192a-192c), such as to restrict movement of a fastener 190a-190c (e.g., generally in a Z-direction) and/or to prevent the fastener 190a-190c from passing completely through the connection tower 170a-170c. Additionally or alternatively, a lip 176a-176c may provide a structure that a fastener 190a-190c may engage/contact to secure an electrical assembly 100 to an electrical connector 102a-102c and/or a support structure 106. In some configurations, an internal lip 176a-176c extends generally obliquely or perpendicularly to a Z-direction and/or projects (e.g., radially) inward from a first portion 172a-172c of a connection tower 170a-170c. An internal lip 176a-176c may be a substantially annular and/or may define a lip opening 178a-178c into which at least a portion of a fastener 190a-190c may extend and/or pass through. A diameter of a lip opening 178a-178c may be smaller than a diameter of at least a portion of a fastener 190a-190c (e.g., a head diameter of a head portion 192a-192c of a fastener 190a-190c) and/or may be larger than a diameter of at least a portion of a fastener 190a-190c (e.g., a shaft diameter of a shaft portion 194a-194c of a fastener 190a-190c).

With some embodiments, such as generally illustrated in FIG. 5, a connection tower 170a-170c and/or a first portion 172a-172c includes an external lip 180. An external lip 180 is configured to contact at least a portion of a cover 114, such as to support the cover 114 and/or facilitate sealing a cover opening 122a-122c. An external lip 180 extends generally obliquely or perpendicularly to a Z-direction and/or projects (e.g., radially) outward from a first portion 172a-172c of a connection tower 170a-170c. An external lip 180 may be a substantially annular. An outer diameter of the external lip 180 may be greater than an outer diameter of a remainder of the first portion 172a-172c and/or greater than a diameter of a cover opening 122a-122c. The external lip 180 may, in some configurations, function as a seal or grommet.

With some embodiments, such as generally illustrated in FIGS. 3B-7B, a second portion 182a-182c of a connection tower 170a-170c is configured to contact a base 130 and/or support the inner housing 150 within the housing 110. A second portion 182a-182c protrudes from a main portion 152 of the inner housing 150 (e.g., generally in a Z-direction toward the base 130) and/or may have a free end. A second portion 182a-182c is connected to and/or integrally formed with a first portion 172a-172c. In some examples, some of a second portion 182a-182c is disposed radially inward of a first portion 172a-172c, such that the first portion 172a-172c and the second portion 182a-182c at least partially overlap in a radial direction. A second portion 182a-182c extends from an internal lip 176a-176c (e.g., generally in a Z-direction toward the base 130) and/or extends around a perimeter of a lip opening 178a-178c (e.g., in a circumferential direction). A second portion 182a-182c (e.g., a free end thereof) engages, contacts, and/or abuts a base 130 in a region of/proximate base opening 142a-142c and/or a boss 144a-144c. In some examples, a second portion 182a-182c (e.g., an axial surface of a flange 184a-184c thereof) contacts, abuts, rests on, etc. a bottom portion 132 of a base 130 and/or a boss 144a-144c (e.g., an axial face 146a-146c thereof). An outer diameter of a second portion 182a-182c may be substantially equal to an outer diameter of a boss 144a-144c and/or may be smaller than an inner diameter of a first portion 172a-172c. An inner diameter of the second portion 182a-182c may be equal to and/or larger than a diameter of at least a portion of a fastener 190a-190c (e.g., a shaft diameter of a shaft portion 194a-194c of a fastener 190a-190c) and/or an inner diameter of a base opening 142a-142c.

With some embodiments, such as generally illustrated in FIGS. 4 and 6, a connection tower 170a-170c includes one or more ribs 186a-186d (e.g., a first rib 186a, a second rib 186b, a third rib 186c, and/or a fourth rib 186d) configured to reinforce and/or strengthen a first portion 172a-172c, a second portion 182a-182c, and/or an internal lip 176a-176c of the connection tower 170a-170c. A rib 186a-186d extends between and connects a first portion 172a-172c, a second portion 182a-182c, and/or an internal lip 176a-176c of a connection tower 170a-170c. A rib 186a-186d is connected to an interior surface of the first portion 172a-172c, an exterior surface of the second portion 182a-182c, and/or an axial surface of an internal lip 176a-176c.

With some embodiments, such as generally illustrated in FIGS. 1 and 4-7B, a fastener 190a-190c includes a head portion 192a-192c and/or a shaft portion 194a-194c. A shaft portion 194a-194c is connected to and/or protrudes from a head portion 192a-192c. A shaft portion 194a-194c may be threaded. A head portion 192a-192c has a head diameter, which is larger than a shaft diameter of a shaft portion 194a-194c. In some examples, a fastener 190a-190c may be configured as a bolt.

Figure 7B:
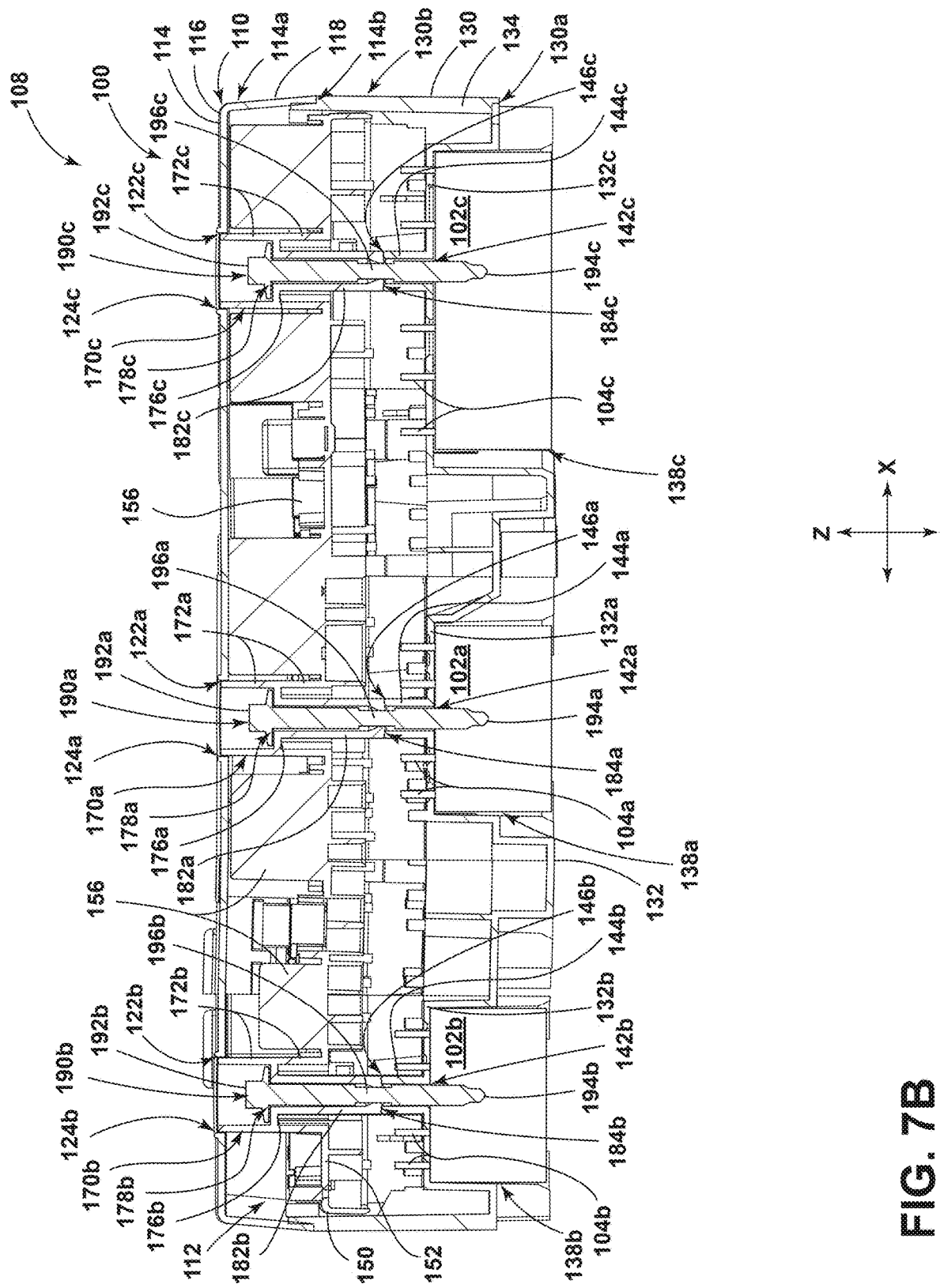
FIG. 7B is a cross-sectional view generally illustrating an embodiment of an electrical assembly with the fasteners disposed in a second position according to teachings of the present disclosure.

With some embodiments, such as generally illustrated in FIGS. 1 and 5-7B, a fastener 190a-190c is adjustable to a first position (see, e.g., FIGS. 1, 5, 6, and 7A) and/or a second position (see, e.g., FIG. 7B). An electrical assembly 100 and one or more electrical connectors 102a-102c and/or support structures 106 can be disconnected from one another and/or separatable from one another when one or more fasteners 190a-190c (e.g., all fasteners 190a-190c) are disposed in a first position. When in a first position, (i) a portion of the fastener 190a-190c (e.g., a head portion 192a-192c) is disposed proximate a cover opening 122a-122c and/or an end of a connection tower 170a-170c (e.g., a free end of a first portion 172a-172c and/or spaced apart from an internal lip 176a-176c generally in a Z-direction), (ii) a portion of the fastener 190a-190c (e.g., a shaft portion 194a-194c) contacts and/or engages a boss 144a-144c of a base 130, and/or (iii) a portion of the fastener 190a-190c (e.g., a shaft portion 194a-194c) is disposed in a base opening 142a-142c and/or projects, at least to some degree, into a connector receptacle 138a-138c. In some configurations, a fastener 190a-190c does not positively engage a boss 144a-144c, and/or the fastener 190a-190c and the boss 144a-144c may not materially affect relative movement of each other.

With some embodiments, an electrical assembly 100 and one or more electrical connectors 102a-102c and/or support structures 106 are connected, secured, and/or fixed to one another when one or more fasteners 190a-190c (e.g., all fasteners 190a-190c) are disposed in a second position. When a fastener 190a-190c is in a second position, a flange 184a-184c is disposed at least partially in a recess 196a-196c of the fastener 190a-190c, which restricts axial movement of the fastener 190a-190c, such as in one or both Z-directions. For example, the fastener 190a-190c can move freely in the axial direction until an end of the recess 196a-196c contacts the flange 184a-184c. Such a configuration may facilitate adjustment of the fastener 190a-190c, such as to fasten the fastener 190a-190c with an electrical connector 102a-102c and/or a support structure 106, while also restricting and/or preventing the fastener 190a-190c from being removed from the electrical assembly 100 (e.g., unintentionally). For example, with some configurations, initial assembly of an electrical assembly 100 includes moving a fastener 190a-190c from a first position to a second position. Then, the electrical assembly 100 is moved into position for connection with one or more electrical connectors 102a-102c and/or a support structure 106. During such movement, which, in some instances, involves moving the electrical assembly 100 from one facility to another and/or to a different part of the same facility, the fastener 190a-190c is retained relative to the electrical assembly 100 via the flange 184a-184c, which can limit the risk of loss of the fastener 190a-190c and/or improve assembly/mounting efficiency. In some instances, a recess 196a-196c corresponds to a section of the shaft portion 194a-194c having a reduced diameter. The recess 196a-196c extends in an axial direction, such as to allow/facilitate axial movement of the fastener 190a-190c while the fastener 190a-190c is in the second position.

With some embodiments, during connection with one or more electrical connectors 102a-102c and/or a support structure 106, the fastener 102 can remain in a second position, move between axial ends of the recess 196a-196c, and/or rotate while in the second position, such as to fasten/screw the electrical assembly 100 with the one or more electrical connectors 102a-102c and/or the support structure 106. In embodiments, when a fastener 102a-102c is in a second position, such as after connection with one or more electrical connectors 102a-102c and/or a support structure 106, (i) a portion of the fastener 190a-190c (e.g., a head portion 192a-192c) contacts, abuts, and/or presses against an internal lip 176a-176c of a connection tower 170a-170c, which may press the inner housing 150 and/or the connection tower 170a-170c against a boss 144a-144c and/or a base 130, and/or (ii) a portion of the fastener 190a-190c (e.g., a shaft portion 194a-194c) can be positively engaged with an electrical connector 102a-102c and/or a support structure 106.

With some embodiments, such as generally illustrated in FIGS. 1-7B, a base 130 includes a first connector receptacle 138a, a second connector receptacle 138b, and/or a third connector receptacle 138c configured to at least partially receive a first electrical connector 102a, a second electrical connector 102b, and a third electrical connector 102c, respectively. A base 130 includes a plurality of first conductor openings 140a (e.g., more than 30), a plurality of second conductor openings 140b, and/or a plurality of third conductor openings 140c, which may be disposed in and/or defined by a section 132a-132c of the bottom portion 132 that at least partially defines a closed end of a respective connector receptacle 138a-138c. A base 130 includes a first base opening 142a, a second base opening 142b, and/or a third base opening 142c, which may be disposed in and/or defined by a section 132a-132c of the bottom portion 132 that at least partially defines a closed end of a respective connector receptacle 138a-138c. In some configurations, a base 130 includes a first boss 144a, a second boss 144b, and/or a third boss 144c, which may extend around and/or at least partially define a corresponding base opening 142a-142c. A first electrical connector 102a, a second electrical connector 102b, and/or a third electrical connector 102c includes a plurality of first electrical conductors 104a, a plurality of second electrical conductors 104b, and a plurality of third electrical conductors 104c, respectively. A first electrical connector 102a, a second electrical connector 102b, and/or a third electrical connector 102c can be disposed in the corresponding connector receptacle 138a-138c such that the first, second, and/or third electrical conductors 104a-104c extend into the internal space 112 of the housing 110 via the corresponding conductor openings 140a-140c and engage one or more electrical components 126 disposed within the housing 110 to establish an electrical connection therebetween.

In some embodiments, an inner housing 150 includes a first connection tower 170a, a second connection tower 170b, and/or a third connection tower 170c. A first, second, and/or third connection tower 170a-170c include a respective first portion 172a-172c, second portion 182a-182c, internal lip 176a-176c, lip opening 178a-178c, external lip, and/or plurality of ribs (which may be configured similarly to ribs 186a-186d of the first connection tower 170a). An electrical assembly 100 includes a first fastener 190a, a second fastener 190b, and/or a third fastener 190c, each of which may include a head portion 192a-192c and/or a shaft portion 194a-194c. A first fastener 190a engages and/or extends through a first cover opening 122a, a first connection tower 170a, a first boss 144a, a first base opening 142a, and/or a first electrical connector 102a. A second fastener 190b engages and/or extends through a second cover opening 122b, a second connection tower 170b, a second boss 144b, a second base opening 142b, and/or a second electrical connector 102b. A third fastener 190c engages and/or extends through a third cover opening 122c, a third connection tower 170c, a third boss 144c, a third base opening 142c, and/or a third electrical connector 102c.

With some embodiments, a method of assembling an electrical assembly 100 (e.g., an assembly method) includes disposing an inner housing 150 at least partially within a base 130, which may include moving the inner housing 150 onto the base 130 and/or the base 130 onto the inner housing 150. Disposing an inner housing 150 at least partially within a base 130 may include positioning the inner housing 150 and the base 130 such that one or more connection towers 170a-170c engage and/or contact the base 130 in a region of/proximate a corresponding base opening 142a-142c (e.g., such that the connection towers 170a-170c are aligned with the base openings 142a-142c). Engaging a connection tower 170a-170c and a base 130 in a region of/proximate a base opening 142a-142c may include (e.g., directly) contacting, abutting, and/or resting the connection tower 170a-170c (e.g., an axial surface of a flange 184a-184c of a second portion 182a-182c) on the base 130 (e.g., a section 132a-132c of a bottom portion 132 and/or an axial face 146a-146c of a boss 144a-144c), which may provide support for a main portion 152 of the inner housing 150. Disposing an inner housing 150 at least partially within a base 130 may, additionally or alternatively, include engaging a connector 154 of the inner housing 150 with a portion (e.g., an edge 134a) of the base 130, which may facilitate positioning and/or orienting the inner housing 150 relative to the base 130.

With some embodiments, an assembly method includes connecting a cover 114 and a base 130 to form a housing 110, which may include moving the cover 114 onto the base 130 and/or the base 130 onto the cover 114. A cover 114 and a base 130 are connected to one another after disposing the inner housing 150 at least partially within the base 130 such that the inner housing 150 is at least partially enclosed in an internal space 112 of the housing 110. Connecting a cover 114 and a base 130 may include pressing one or more latches 120a-120c of the cover 114 against a corresponding tab 136a-136c of the base 130, which may cause the latch 120a-120c to temporarily deflect, deform, and/or flex, to engage the one or more latches 120a-120c and the corresponding tab 136a-136c. Connecting a cover 114 and a base 130 may include engaging a connector 154 of an inner housing 150 with a portion (e.g., an edge 118a) of the cover 114 and/or a portion (e.g., an edge 134a) of the base 130, which may connect and/or secure the inner housing 150 to the housing 110.

In some embodiments, connecting a cover 114 and a base 130 includes positioning the cover 114, the inner housing 150, and/or the base 130 such that one or more connection towers 170a-170c engage and/or contact the cover 114 in a region of/proximate a corresponding cover opening 122a-122c (e.g., such that the connection towers 170a-170c are aligned with the cover openings 122a-122c), which may substantially seal the cover openings 122a-122c of the cover 114. Engaging a connection tower 170a-170c and a cover 114 in a region of/proximate a cover opening 122a-122c may include disposing at least a portion of the connection tower 170a-170c (e.g., a first portion 172a-172c) in the cover opening 122a-122c. Disposing a portion of a connection tower 170a-170c in a cover opening 122a-122c may include (e.g., directly) contacting and/or abutting an exterior surface 174a-174c of a first portion 172a-172c of the connection tower 170a-170c and a radially inward facing surface 124a-124c of the cover 114 and/or a cover opening seal. Engaging a connection tower 170a-170c and a cover 114 in a region of/proximate a cover opening 122a-122c may also include contacting, abutting, and/or resting the cover 114 on an external lip 180 of the connection tower 170a-170c, which may facilitate sealing of the cover opening 122a-122c and/or provide additional support for the cover 114. The external lip 180, in some instances, may include a separate seal member and/or may comprise a material (e.g., a low durometer plastic) configured for providing a fluid seal with the cover 114.

With some embodiments, an assembly method includes connecting one or more fasteners 190a-190c to an inner housing 150, a base 130, and/or a housing 110. Connecting a fastener 190a-190c to an inner housing 150 may include inserting at least a portion of a fastener 190a-190c through a cover opening 122a-122c into a connection tower 170a-170c of the inner housing 150 and/or engaging at least a portion of the fastener 190a-190c (e.g., a shaft portion 194a-194c) and the connection tower 170a-170c (e.g., a second portion 182a-182c of a connection tower 170a-170c). One or more fasteners 190a-190c may be connected to an inner housing 150 before and/or after disposing the inner housing 150 in a base 130. Connecting a fastener 190a-190c to a base 130 may include inserting at least a portion of a fastener 190a-190c into a base opening 142a-142c and/or a boss 144a-144c of the base 130. The fastener 190a-190c (e.g., a shaft portion 194a-194c) may or may not engage the base 130 (e.g., the boss 144a-144c). One or more fasteners 190a-190c may be connected to a base 130 after disposing the inner housing 150 in the base 130. One or more fasteners 190a-190c may be connected to a base 130 before and/or after connecting a cover 114 and the base 130 to form a housing 110. The one or more fasteners 190a-190c may not be utilized, at least directly, in connecting the cover 114 with the inner housing 150 or the base 130. For example and without limitation, the one or more fasteners 190a-190c may not contact the cover 114 in some configurations and/or may not apply a force to the cover 114, even when connected (e.g., screwed into) an electrical connector 102a-102c and/or a support structure 106, in some configurations.

With some embodiments, a method of mounting an electrical assembly 100 (e.g., a mounting method) includes engaging the electrical assembly 100 and one or more electrical connectors 102a-102c (e.g., of a vehicle 108), which may include disposing one or more electrical connectors 102a-102c in a corresponding connector receptacle 138a-138c of a base 130 of the electrical assembly 100. Disposing an electrical connector 102a-102c in a connector receptacle 138a-138c may include moving the electrical assembly 100 onto the electrical connector 102a-102c (e.g., from the position in FIG. 7A to the position in FIG. 7B) and/or inserting the electrical connector 102a-102c into the connector receptacle 138a-138c (e.g., from the position in FIG. 7A to the position in FIG. 7B). Disposing an electrical connector 102a-102c in a connector receptacle 138a-138c may include engaging one or more electrical conductors 104a-104c of the electrical connector 102a-102c with one or more electrical components 126 disposed within the housing 110 of the electrical assembly 100 to establish an electrical connection therebetween. Engaging an electrical conductor 104a-104c and one or more electrical components 126 of the electrical assembly 100 may include disposing a portion of an electrical conductor 104a-104c in an internal space 112 of the housing 110 via a conductor opening 140a-140c of the base 130.

In some embodiments, a mounting method includes engaging one or more fasteners 190a-190c of an electrical assembly 100 and one or more electrical connectors 102a-102c without disconnecting the base 130 and the cover 114 of the electrical assembly 100 from one another. Engaging a fastener 190a-190c and an electrical connector 102a-102c may include engaging at least a portion of the fastener 190a-190c (e.g., a head portion 192a-192c) with a tool (e.g., a socket wrench, screwdriver, socket, among others) and actuating the fastener 190a-190c (e.g., rotating) with the tool to adjust the fastener 190a-190c. Actuating the fastener 190a-190c (e.g., rotating) with the tool may include inserting at least a portion of the tool into a connection tower 170a-170c of the electrical assembly 100 via a cover opening 122a-122c of a cover 114 of the electrical assembly 100. While the fastener 190a-190c is actuated, the fastener 190a-190c may remain in a second position, which may include moving, at least to some degree, in an axial direction (e.g., until a flange 184a-184c contacts an upper end of a recess 196a-196c).

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. An electrical assembly, comprising:
   a housing including:
      a base; and
      a cover releasably connectable to the base; and
   an inner housing disposed at least partially in the housing, wherein
      the inner housing includes a connection tower configured to receive a head portion of a fastener, such that a first portion of the connection tower has an inner diameter that is greater than a head diameter of the head portion of the fastener,
      the cover includes a cover opening via which the fastener is insertable into the connection tower,
      the base includes a base opening into which a portion of the fastener is insertable, and
      the connection tower is configured to provide a seal for the cover opening.

2. The electrical assembly of claim 1, wherein the connection tower contacts the cover.

3. The electrical assembly of claim 1, wherein the connection tower projects into the cover opening.

4. The electrical assembly of claim 3, wherein the connection tower directly contacts a radially inward facing surface of the cover that defines the cover opening.

5. The electrical assembly of claim 1, wherein the connection tower contacts the base.

6. The electrical assembly of claim 1, wherein:
   the base includes a boss that at least partially defines the base opening; and the connection tower contacts the boss.

7. The electrical assembly of claim 6, wherein an axial surface of the connection tower contacts an axial face of the boss.

8. The electrical assembly of claim 1, wherein a diameter of the cover opening is larger than a diameter of the base opening.

9. The electrical assembly of claim 1, wherein the connection tower includes a lip configured to contact a head of the fastener to restrict the fastener from passing completely through the connection tower.

10. The electrical assembly of claim 1, wherein the first portion projects towards the cover, and the connection tower includes a second portion projecting toward the base.

11. The electrical assembly of claim 10, wherein some of the second portion of the connection tower is disposed radially inward of the first portion of the connection tower such that the first portion and the second portion overlap to some degree in a radial direction.

12. The electrical assembly of claim 11, wherein the connection tower includes a plurality of ribs extending between and connecting the first portion of the connection tower and the second portion of the connection tower.

13. The electrical assembly of claim 10, wherein:
   the first portion of the connection tower includes an internal lip, and
   the second portion of the connection tower projects from the internal lip toward the base.

14. The electrical assembly of claim 1, wherein the cover is an external cover configured such that the cover opening is not covered by another housing portion and the fastener is accessible.

15. The electrical assembly of claim 1, wherein the fastener is releasably connectable to at least one of an electrical connector and a support structure to secure the housing thereto without disconnecting the cover from the base.

16. A method of assembling the electrical assembly of claim 1, comprising:
- disposing the inner housing and the base such that the second end of the connection tower contacts the base;
- disposing the cover and the inner housing such that the first end of the connection tower contacts the cover; and
- connecting the cover and the base together to form the housing.

17. The method of claim 16, wherein disposing the cover and the inner housing includes sealing the cover opening via disposing the connection tower in the cover opening.

18. The method of claim 16, wherein disposing the inner housing and the base includes contacting the connection tower and a boss of the base that at least partially defines the base opening.

19. A method of mounting the electrical assembly of claim 1, comprising:
- connecting the electrical assembly with at least one of an electrical connector and a support structure of a vehicle;
- wherein connecting the electrical assembly includes engaging the fastener with the at least one of the electrical connector and the support structure without disconnecting the cover from the base.

20. The method of claim 19, wherein:
- connecting the electrical assembly with the at least one of the electrical connector and the support structure includes disposing a plurality of electrical conductors in a plurality of conductor openings of the base; and
- engaging the fastener with the at least one of the electrical connector and the support structure includes:
  - actuating the fastener with a tool to engage the fastener with the at least one of the electrical connector and the support structure; and
  - inserting at least a portion of the tool in the connection tower via the cover opening.

* * * * *